United States Patent [19]
Berger et al.

[11] 3,726,710
[45] Apr. 10, 1973

[54] SILICON PAPER RELEASE COMPOSITIONS

[75] Inventors: Sidney E. Berger, Rye, N.Y.; Thomas C. Williams, Ridgefield, Conn.

[73] Assignee: Union Carbide Corporation, New York, N.Y.

[22] Filed: Sept. 2, 1970

[21] Appl. No.: 69,126

Related U.S. Application Data

[63] Continuation-in-part of Ser. No. 24,025, March 30, 1970, abandoned.

[52] U.S. Cl. ......... 117/93.31, 117/155, 117/161 ZA, 204/159.13
[51] Int. Cl. ............................. B44d 1/50, C09d 3/82
[58] Field of Search ............... 117/93.31, 161 ZA, 117/155; 204/159.13

[56] References Cited

UNITED STATES PATENTS

| | | | |
|---|---|---|---|
| 3,436,252 | 4/1969 | Neuroth | 117/161 ZA |
| 3,385,727 | 5/1968 | Thomas et al. | 117/161 ZA |
| 3,527,659 | 9/1970 | Keil | 117/161 ZA |
| 2,940,875 | 6/1960 | Smith et al. | 117/161 ZA |
| 3,096,303 | 7/1963 | Caprino et al. | 117/161 ZA |
| 3,076,726 | 2/1963 | Ault et al. | 117/161 ZA |
| 2,413,973 | 1/1947 | Howk | 117/93.31 |
| 3,157,560 | 11/1964 | Livingston et al. | 117/93.31 |

Primary Examiner—Alfred L. Leavitt
Assistant Examiner—John H. Newsome
Attorney—Paul A. Rose, A. J. Cozzi, Eugene C. Trautlein and Reynold J. Finnegan

[57] ABSTRACT

Curable silicone release compositions comprising a crosslinkable olefinic containing organopolysiloxane compound and a photosensitizer and a paper substrate coated therewith; a process for preparing silicone paper release articles comprising subjecting said compositions coated on a paper substrate to high intensity predominantly continuum light radiation in order to crosslink the siloxane; and the silicone paper release articles obtained by said process.

30 Claims, No Drawings

SILICON PAPER RELEASE COMPOSITIONS

This application is a continuation-in-part of applicants' copending U.S. application Ser. No. 24,025, filed March 30, 1970 now abandoned.

BACKGROUND OF THE INVENTION

This invention relates to a curable silicone release composition, a paper substrate coated therewith, a method for preparing silicone release papers and the products derived therefrom. More particularly this invention relates to a method for preparing silicone release papers by coating the substrate with a release composition comprising a curable organopolysiloxane and a photosensitizer and exposing the coated paper to a source of high intensity predominantly continuum light radiation to crosslink the siloxane compound.

Silicone release papers are well known and widely used in a variety of commercial applications. For example, pressure-sensitive adhesives, such as decals, labels, tapes and the like, employ silicon release paper as a protective covering for the adhesive. When such pressure-sensitive materials are used, the release paper may be merely peeled off and discarded and said adhesives employed as desired.

Heretofore, silicone release papers have been generally prepared by first forming a curable release composition consisting of (1) a hydroxy end-blocked dimethylsiloxane gum stock; (2) a crosslinking agent such as a siloxane fluid containing silicon bonded hydrogen units (Si-H); (3) a catalyst such as a metal salt of a carboxylic acid and (4) a solvent such as xylene. The composition is then applied to the paper substrate in the form of a thin coating and the coated substrate heated mildly to remove the solvent. After the solvent has been removed the siloxane composition on the substrate is cured at very high temperatures, e.g., 100°C. to 150°C., to crosslink the siloxane gum and form the desired release paper product.

The disadvantage of such prior art processes are obvious. To begin with the use of four different ingredients contributes to the high cost of the final product. The use of the solvent generally necessary to reduce the viscosity of the composition so that it may easily be applied to the substrate causes the operation to become a two-stage process, since said solvent must be removed prior to the curing of the siloxane gum. Moreover, such curable compositions have a very low pot life and normally must be mixed and used immediately to avoid premature crosslinking of the siloxane gum. In addition, the high cure temperatures employed very often cause the paper to dry and shrink resulting in cockling and rippling of the paper. When this occurs it is necessary to dehumidify the release paper to smooth it out again, however, it is extremely difficult to ever return the paper to its original smoothness. Attempts to minimize this problem by employing lower cure temperatures generally result in merely extending the rate of cure thereby adding to the time and expense of the operation.

SUMMARY OF THE INVENTION

It has now been discovered that the above problems and disadvantages can be overcome and that excellent silicone release papers can be prepared by the instant invention which involves the use of high intensity predominantly continuum light radiation to effect the cure of the instant release composition while it is coated on the paper substrate.

Therefore, it is an object of this invention to provide curable silicone release compositions and paper substrates coated therewith. Another object of this invention is to provide a method for preparing silicone release papers utilizing a source of high intensity predominantly continuum light radiation to effect the cure of the above silicone compositions. Still a further object of this invention is to provide silicone release papers prepared by the above process. Other objects and advantages of this invention will become readily apparent from the following description and appended claims.

More specifically the curable silicone release compositions of this invention comprise (a) a crosslinkable organopolysiloxane compound containing olefinic siloxy groups and (b) a photosensitizer, which compositions can be coated on a paper substrate and cured with a source of high intensity predominantly continuum light radiation to crosslink the olefinic containing siloxane compound to produce a silicone release paper.

DESCRIPTION OF THE PREFERRED EMBODIMENTS

The organopolysiloxane compounds which are crosslinkable and useful as the starting materials of the instant invention are those organopolysiloxane compounds having the average formula

$$\left[ R_n SiO_{\frac{4-n}{2}} \right]_x \quad (I)$$

wherein each R is individually an unsubstituted monovalent hydrocarbon radical having from one to 20 carbon atoms or a substituted monovalent hydrocarbon radical having from one to 20 carbon atoms wherein the substituents are selected from the class consisting of chloro, fluoro, cyano, amino, amido, nitro, ureido, isocyanato, mercapto, carbalkoxy, acryloyl, methacryloyl, and the like; wherein n has an average value of from about 1.8 to about 2.2; and wherein x has an average value greater than 2, said organopolysiloxane having an average of at least two pendant silicon bonded olefinic siloxy units (i.e., R(X)SiO units where X is an olefinic radical) per polymer molecule.

The above mentioned organopolysiloxanes and methods for their preparation are well known in the art, as shown for example by U.S. Pat. Nos. 2,445,799; 2,954,357; and 3,183,205, the disclosures of which patents are incorporated herein by reference thereto. While said organopolysiloxanes can be linear, branched or cyclic the preferred siloxanes are those which are essentially linear polymers and which may contain small amounts of low molecular weight cyclic siloxanes as impurities from the process used in preparing said siloxanes. As is this case with all siloxane polymers, said organopoly-siloxanes may contain varying proportions of organosiloxy units, such as $R_3SiO_{0.5}$; $R_2SiO$; $RSiO_{1.5}$ and $SiO_2$ within the scope of general Formula (I) set forth above and where R in said siloxy units is the same as defined above. Moreover, if desired the organopolysiloxanes can contain minor amounts of functional end-blocking groups such as halogens, alkoxy groups, acyloxy, dimethylamino, and hydroxy groups, and the like. These organopolysiloxanes are fluid polymers ranging in viscosity at 25°C. of from about 1 centipoise to about 50,000,000 centipoises.

As noted above, R may be any monovalent hydrocarbon radical containing from one to 20 carbon atoms, and the radicals represented by R on any given silicon atom may be the same or different. Among the more specific radicals that may be mentioned are, for example, alkyl radicals, such as methyl, ethyl, propyl, butyl, isobutyl, amyl, hexyl, octadecyl and the like; alkylene radicals, such as vinyl, allyl and the like; alicyclic radicals, such as cyclopentyl, cyclohexyl and the like; aryl radicals, such as phenyl, naphthyl and the like; aralkyl radicals, such as benzyl, phenylethyl and the like; and alkaryl radicals such as tolyl, xylyl, mesityl and the like. Suitable illustrative substituted monovalent hydrocarbon radicals are for example, 3,3,3-trifluoropropyl, 3-chloropropyl, 2-cyanoethyl, 4-aminobutyl, 3-methacryloxypropyl, bromomethyl, 3-nitrophenyl, and the like.

Illustrative examples of the olefinic radicals of said olefinic siloxy units are for example vinyl, allyl, cyclohexenyl, methacryloxypropyl, and the like.

More particularly, illustrative of said organopolysiloxane starting materials are those preferred fluid copolymers having a viscosity of about 100 centipoises to about 1,000,000 centipoises at 25°C. which contain an average of at least two vinyl siloxy units per polymer molecule such as MeViSiO, EtViSiO, $Vi_2SiO$ and the like and which can also contain one or more organosiloxy units such as $Me_2SiO$, $Et_2SiO$, MeEtSiO, $Me\phi SiO$, $MeC_8H_{17}SiO$, MeHSiO, $(C_8H_{17})_2SiO$, $\phi_2SiO$, Me($\phi CH_2$)SiO, $CH_3\phi MeSiO$, $Me_3SiO$, $Et_3SiO$, HO(Me)$_2$SiO, (CH$_3$O)(Me)$_2$SiO, C/(Me)$_2$SiO and the like, wherein Me represents a methyl radical, wherein Et represents an ethyl radical, wherein $\phi$ represents a phenyl radical and wherein Vi represents a vinyl radical (—CH$_2$=CH).

Of course it is to be understood that the organopolysiloxane starting material which is to be cured can be a homopolymer, a copolymer or terpolymer and can be either a single compound or a mixture of two or more different siloxanes, the only requirement being that the starting material contain an average of at least two olefinic siloxy units per polymer molecule.

The most preferred organopolysiloxane starting materials are those linear copolymers consisting essentially of dimethylsiloxy units and at least two methyl vinyl siloxy units per polymer molecule and terminated with trimethylsiloxy units.

The above organopolysiloxanes are mixed with a photosensitizer prior to coating the substrate and exposing the coated article to the high intensity predominantly continuum light radiation source as explained below.

Any known photosensitizer or compound which possesses the properties of a photosensitizer, e.g., a compound which can absorb light energy and pass temporarily into an excited state and while in the excited state can transfer its energy to another compound and return to its original unexcited state can be used. Illustrative examples of such photosensitizers include acetophenone, propiophenone, benzophenone, 4,4'-bis(di-methylamino)benzophenone, xanthone, fluorenone, benzaldehyde, fluorene, anthraquinone, triphenylamine, carbazole, 3- or 4-methyllactophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzo-phenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonyl-xanthone, 3-methoxyxanthone, 3-iodo-7-methoxyxanthone, and the like.

Of course, it is obvious that one or more photosensitizers can be employed in any composition, if desired, and that one is not restricted to those specifically named above.

The admixture of organopolysiloxane and photosensitizer is accomplished merely by mixing the ingredients in any suitable manner and the order of addition is obviously not critical. Of course the amount of photosensitizer need only be a photosensitizing amount. Normally an amount of photosensitizer falling within the range from about 0.01 to about 20 weight percent of the siloxane polymer employed will be sufficient for most purposes. Preferably the amount of photosensitizer ranges from about 0.1 to about 5 weight percent, while the most preferred amount is from about 0.5 to about 2 weight percent. Since the amount of photosensitizer is so small it need not be removed from the final cured product.

The manner in which the instant organopolysiloxane photosensitizer curable release compositions of this invention are coated on the paper substrate is not critical. Said compositions can be applied by any conventional technique employing any conventional equipment, such as spraying, dipping, padding, roll-coating, and the like and using rotogravure rolls, roll-coaters, knife coaters and the like. The procedure is governed only by such noncritical functional factors as the availability of equipment on hand, the desired end-product to be produced, the personal choice of the operator and the like. Generally it is preferred to first throughly mix the siloxane and photosensitizer ingredients and then coat the paper substrate. However they may be applied to the paper substrate separately or sprayed on simultaneously if desired. It should also be understood that the coating operation can be carried out batchwise or continuously. Moreover, one or both sides of the paper can be coated depending on the desired end use of the product. The thickness of the coating is also not critical and also merely depends on the desired end product to be produced. Generally the coating on most release papers are only from about 0.1 to 5.0 mils thick. An additional advantage of the instant invention is that the curable release composition may be applied to the paper substrate all at once or in successive operations so as to build up the thickness of the coating layer by layer if desired.

The curable organopolysiloxane-photosensitizer compositions of this invention which have been coated on the paper substrate are cured according to the instant invention by subjecting the coatings to a type of light radiation emitting a high intensity predominantly continuum light radiation containing ultraviolet, visible and infrared radiation to crosslink the siloxane.

The term "high intensity predominantly continuum light radiation" means continuum radiation with a source intensity of at least 350 watts per square centimeter steradian when integrated throughout the entire spectral range of said continuum light radiation (about 1,000 kilowatts per square foot of source projected area) having only a minor part of the energy in peaks of bandwidths less than 100 Angstrom units, with a positive amount up to about 30 percent of the light radiated having wavelengths shorter than 4,000 Angstrom units and at least about 70 percent of the light energy radiated having wavelengths longer than 4,000 Angstrom units. The high intensity predominantly continuum nature of the light radiation over the range of source intensity can vary from about 350 watts per square centimeter steradian to about 5,000 watts per square centimeter steradian. As stated, the light radiated is predominantly continuum light with very little light emitted as line or peak radiation (band widths less than 100 Angstrom units, wherein a positive amount up to about 30 percent of the light radiated has wavelengths shorter than 4,000 Angstrom units and at least about 70 percent of the radiated light has wavelengths longer than 4,000 Angstrom units.

This light radiation is derived from an artificial source that generates high intensity predominantly continuum light radiation with a source intensity of at least about 350 watts per square centimeter steradian when integrated throughout the entire spectral range of said continuum light radiation, as abbreviated by the term: watts $cm^{-2}$ $sr^{-1}$; said high intensity predominantly continuum artificial light radiation has at least about 70 percent of the light radiated at a wavelength longer than 4,000 Angstroms and less than about 30 percent of the light radiated having a wavelength shorter than 4,000 Angstroms, generally about 80 percent of the light radiated has a wavelength longer than 4,000 Angstroms and less than about 20 percent of the light radiated has a wavelength shorter than 4,000 Angstroms, and a source intensity that can vary from about 350 watts (about 1000 kilowatts per square foot of source projected area) to about 5,000 watts (about 15,000 kilowatts per square foot of source projected area) or more per square centimeter steradian. A convenient source of high intensity predominantly continuum light radiation is a swirl-flow plasma arc light radiation apparatus. The equipment for generating high intensity predominantly continuum light radiation by this means is known and available; many different forms thereof are described in the literature. A highly efficient apparatus for obtaining high intensity predominantly continuum light radiation is the swirl-flow plasma arc radiation source described in U.S. Pat. No. 3,364,387. The apparatus or equipment necessary for generating the light radiation is not the subject of this invention and any source or apparatus capable of generating high intensity predominantly continuum light radiation can be used.

While any artificial source of generating high intensity predominantly continuum light radiation can be used, as previously indicated the swirl-flow plasma arc radiation apparatus is most convenient. Hence, this source will be used in this application as illustrative of a means for obtaining the high intensity predominantly continuum light radiation. Any apparatus that operates according to the known principles of the swirl-flow plasma arc radiation source can be used to produce the high intensity predominantly continuum light radiation useful in the processes of this invention. These apparatuses are often known by other terms but those skilled in this art recognize that they emit high intensity predominantly continuum light radiation. The source of radiation in a 50 kilowatt swirl-flow plasma arc radiation source is an arc only about four inches long enclosed in a quartz envelope about 1.5 inches in diameter. This lamp can be readily removed and refurbished and has an acceptable long lifetime. Further, a swirl-flow plasma arc radiation apparatus having a 250 kilowatt rating would be only about two or three times as large as a 50-kilowatt source. Another advantage is the absence of a need for expensive radiation shielding. Precautions required for the artificial light sources include those needed to protect one's eyes from the intense visible light and from the ultraviolet light present to prevent inadvertent sunburn effect on the body.

This high intensity predominantly continuum light radiation contains a continuum of radiation throughout the entire spectral range. This type of continuum radiation in the ultraviolet range has not heretofore been obtainable from the conventional commercially mercury arcs or lamps generally available for generating ultraviolet light. The previously known means for generating ultraviolet light produced light that shows a line or peak spectrum in the ultraviolet range, it is not a continuum spectrum in the ultraviolet range. In a line spectrum the major portion of useable ultraviolet light is that portion at which the line or band in the spectrum forms a peak; in order for such energy to be useful the material or composition that is to be treated with ultraviolet radiation must be capable of absorbing at that particular wavelength range at which the peak appears. In the event the material or composition does not have the ability to absorb at that particular wavelength range there is little or no absorption or reaction. Thus, in the event the material or composition to be treated absorbs at a particular wavelength range in one of the valleys of the spectral curve there will be no reaction since there is little or no ultraviolet energy to adequately excite the system. With a high intensity predominantly continuum radiation, there is a high intensity continuum radiation of ultraviolet energy across the entire ultraviolet wavelength range of the spectrum and there is generally sufficient ultraviolet energy generated at all useful ultraviolet wavelengths to enable one to carry out reactions responsive to ultraviolet radiation without the problem of selecting compounds that will absorb at the peak wavelength bands only. With the high intensity continuum radiation it has been discovered that one does not have the problem of being unable to react materials or compositions that absorb in the valley areas only since for all intents and purposes such valleys do not exist in high intensity continuum radiation, the high intensity radiated light energy is essentially a continuum, it is not in peak bands.

Thus high intensity predominantly continuum light radiation is to be distinguished from low intensity ultraviolet radiation generated by commercially available low, medium and high pressure mercury arc ultraviolet lamps. These mercury arc lamps produce light emission which is primarily line or peak rather than continuum light wherein a major part of the light appears in bands narrower than 100 Angstrom units, and much less than 70 percent is above 4,000 Angstom units. Moreover, for comparison, the largest such mercury lamp of any commercial utility is generally about 5 feet long having a diameter of about one to two inches and generates a low intensity ultraviolet light line structure having a source intensity generally no greater than about 20 kilowatts per square foot of source projected area. While such mercury lamps may be used as a possible alternative they are not preferred.

As is known, high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder creates a swirling flow or vortex which restricts the arc to a small diameter. The proper selection of the gaseous medium in which the arc operates determines the wavelength range of the radiated light. All of the gases exhibit well-defined high intensity predominantly continuum light radiation. An electrical potential applied across the electrodes causes a high density current to flow through the gas to generate a plasma composed of electrons, positively charged ions and neutral atoms. A plasma generated in the above gases produces high intensity predominantly continuum light radiation with diffuse maxima in the region of from about 3,500 to about 6,000 Angstroms. The radiation source can also be used with reflectors or refractive optical systems to direct the high intensity predominantly continuum light radiation emanating from the arc to a particular point or direction or geometrical area.

The time needed to cure the organopolysiloxane-photosensitizer release compositions which have been coated onto the paper substrate with the high intensity predominantly continuum light radiation is generally only a matter of seconds or at most several minutes. Moreover, the process can be carried out continuously by passing the coated paper substrate through a transparent conduit or other means positioned in such a way so that the curable composition is exposed to the high intensity predominantly continuum light radiation for the required time necessary to crosslink the olefinic containing organosiloxane compound in the coated composition. Alternatively the process can be carried out batchwise by placing the coated paper substrate in a suitable container and exposing the curable composition to the high intensity predominantly continuum light radiation source, although for commercial reasons the continuous type process is preferred. The temperature of the curing process is not critical and can vary from about 0°C. to 250°C. or higher; while temperatures of about 20°C. to 100°C. are preferred. Of course, the pressure can be subatmospheric, atmospheric, or superatmospheric and the process can be carried out in the normal atmosphere or in the presence of nitrogen, $CO_2$, the noble gases such as neon, argon, or the like. Generally, it is most preferred to operate at about room temperature and at normal atmospheric pressure and in a normal air or nitrogen atmosphere.

Of course, it is to be understood that if desired the instant curable organsiloxane-photosensitizer compositions can contain additional ingredients commonly employed in preparing release papers. For example, small amounts of conventional inert organic solvents or mixtures thereof can be employed to assist in the coating application of the curable release compositions to the paper substrate. Illustrative examples of such organic solvents are aliphatic hydrocarbons, such as cyclohexane, pentane, neopentane, hexane, heptane and the like; aromatic hydrocarbons, such as benzene, toluene, xylene, tetrahydronaphthalene, cumene and the like; halogenated hydrocarbons, such as carbon-tetrachloride, chloroform, dichloromethane, tetrachloroethylene, monochlorobenzene, orthodichlorobenzene, trichlorobenzene, and the like; ethers, such as diethyl ether, diisopropyl ether, dibutyl ether, amyl ether, diphenyl ether, amyl ether, diphenyl ether and the like; ketones, such as ethylisobutyl ketone, and the like; N,N-dialkyl amides, such as dimethyl formamide, dimethyl acetamide, and the like; alkyl sulfoxides, such as dimethyl sulfoxide, tetramethylene sulfoxide, and the like; or organic compounds, such as polyethylene glycol, cellulose ethers, polyvinyl alcohol, polyarylamides, aliphatic fluorocarbons and low boiling siloxanes. Preferably such solvents are employed only when the crosslinkable siloxane polymer used is a high molecular weight gumstock in order to assist the coating procedure. The solvents can then be easily removed prior to curing by air drying the coated paper substrate or by heating it at higher temperatures for a short period of time.

Small amounts of conventional linear hydroxy and/or alkoxy or dialkylamino end-blocked (i.e., terminated) dihydrocarbon siloxane oils or mixtures thereof can also be added to the instant curable siloxane-photosensitizer compositions and are often desirable when said compositions are to be stored for awhile prior to use. Such siloxane oils are well known in the silicone art and serve to prevent bin-aging of curable olefinic siloxanes as shown for example by U.S. Pat. Nos. 2,954,357 and 3,219,726 and need not be removed from the composition for they can remain in the final cured silicone release product without adversely effecting its properties. Illustrative examples of such siloxane oils are hydroxy terminated dimethyl siloxanes, ethoxy terminated dimethyl-siloxanes and dimethyl amino terminated dimethylsiloxanes.

Catalytic amounts of curing agents or mixtures thereof normally employed to crosslink olefinic containing siloxane compounds can also be present, although they are not necessary to the instant curable organosiloxane-photosensitizer compositions and remain after curing. Such catalysts are well known in the art. Illustrative examples of same are the organic peroxides such as di-t-butyl peroxide; t-butyl, triethylmethylperoxide; t-butyl-t-tripyl peroxide; dicumyl peroxide; benzoyl peroxide, t-butylperbenzoate, 1,4-dichlorobenzoyl peroxide; 2,4-dichlorobenzoyl peroxide, monochlorobenzoyl peroxide; and the like. Other additives can also be present in the curable composition if desired such as conventional silica base fillers, inert fillers, pigments and the like.

However, the most preferred curable compositions of this invention are those consisting of basically only two ingredients, the crosslinkable olefinic containing siloxane compounds and the photosensitizers, save, of course, for any impurities that may be present due to the manner in which the two ingredients are made. The final silicone release paper can be manufactured in any convenient widths, lengths or shapes depending upon the desired end use of the tape and in any conventional manner.

To function usefully, the silicone release coating must adhere to the adhesive coating with sufficient strength to withstand the forces normally encountered in handling and manipulating the composites. At the same time, the silicone release coating must separate cleanly from the adhesive coating without requiring excessively high peeling forces that might tear or otherwise rupture the paper substrates. Experience has shown that useful composites normally require peeling forces between a minimum of about 15 to 20 grams per inch of width and a maximum of about 200 grams per inch width.

The silicone release compositions of this invention exhibit excellent stability and no significant increase in bulk viscosity or formation of gel upon storage under ambient conditions for extended periods of time. Moreover the cross-linked irradiated siloxane films obtained via high intensity predominantly continuum light radiation according to this invention exhibit extremely strong adherence to paper substrates and can be separated at the silicone-adhesive interface of the composites by peeling forces well within the recommended useful range given above even generally after having been aged for 3 weeks at 150°F.

The following examples are illustrative of the present invention and are not to be regarded as limitative. It is to be understood that all of the parts, percentages and proportions referred to herein and in the appended claims are by weight unless otherwise indicated.

EXAMPLE 1

A silicone release composition was prepared by dissolving a high molecular weight gumstock copolymer (weight average molecular weight of about 500,000) and consisting essentially of about 99.8 weight percent of dimethylsiloxy units and about 0.2 weight percent of methyl vinyl siloxy units in toluene to form a solution of about 10 weight per cent copolymer solids. Benzophenone at about 3 parts by weight per 100 parts by weight of copolymer was then added to the solution as a photosensitizer. The silicone release composition was then applied to glassine paper with a draw bar and dried to form a coating of about 0.15 grams per square foot of paper and the coated paper dried for 30 seconds at 150°C. to remove the solvent. Silicone release paper was obtained by exposing the silicone coating, in order to crosslink the silicone copolymer coating, to the high intensity predominantly continuum light radiation emanating from an argon 50 kilowatt swirl flow plasma arc radiation source. The samples were irradiated at a distance of about two feet from the arc and for various periods of time as reported below. The crosslinked silicone copolymer film coatings were smooth, insoluble rubbery coatings that adhered tenaciously to the paper substrate.

The crosslinked silicone coated glassine paper releases were then laminated under pressure with two different commercial pressure sensitive adhesive coated label papers so that the two coatings were in firm and continuous contact. The peeling force, measured in grams per inch width, required to separate the composites at the silicone-adhesive interface was then recorded for each sample both initially and after various aging periods at 150°F. The results are reported in the following table.

TABLE I

| Sample Run No. | Adhesive | Exposure Time Seconds | Initial | Peeling Force at 75°F. after 1 Wk at 150°F. | after 3 wk at 150°F. |
|---|---|---|---|---|---|
| 1 | A | 60 | 73 | 42 | 63 |
| 2 | A | 90 | 47 | 22 | 67 |
| 3 | A | 120 | 57 | 75 | 55 |
| 4 | B | 60 | 105 | 102 | 210 |
| 5 | B | 90 | 40 | 80 | 95 |
| 6 | B | 120 | 48 | 137 | >500 |

EXAMPLE 2

The procedure of Example 1, was repeated except that the high molecular weight gunstock copolymer employed consisted essentially of about 99.6 weight percent of dimethyl-siloxy units and about 0.4 weight percent of methylvinylsiloxy units. The peeling forces are recorded in the following table.

TABLE II

| Sample Run No. | Adhesive | Exposure Time Seconds | Initial | Peeling Force at 75°F. after 1 Wk at 150°F. | after 3 wk at 150°F. |
|---|---|---|---|---|---|
| 1 | A | 60 | 85 | 23 | 43 |
| 2 | A | 90 | 55 | 58 | 62 |
| 3 | A | 120 | 43 | 30 | 43 |
| 4 | B | 60 | 63 | 78 | 85 |
| 5 | B | 90 | 48 | 100 | 190 |
| 6 | B | 120 | 50 | 105 | 107 |

EXAMPLE 3

The procedure of Example 1 was repeated except that the high molecular weight gunstock copolymer employed consisted essentially of about 99.2 weight percent of dimethylsiloxy units and about 0.8 weight percent of methylvinylsiloxy units. The peeling forces are recorded in the following table.

TABLE III

| Sample Run No. | Adhesive | Exposure Time Seconds | Initial | Peeling Force at 75°F. after 1 wk at 150°F. | after 1 wk at 150°F. |
|---|---|---|---|---|---|
| 1 | A | 60 | 52 | 23 | 45 |
| 2 | A | 90 | 62 | 28 | 57 |
| 3 | A | 120 | 53 | 60 | 58 |
| 4 | B | 60 | 72 | 128 | 308 |
| 5 | B | 90 | 112 | 103 | 130 |
| 6 | B | 120 | 30 | 68 | 152 |

EXAMPLE 4

Similar silicone paper release articles can be prepared by following the procedure of Example 1 and irradiating a silicone release composition free from any solvent and consisting essentially of about 100 parts by weight of a fluid polysiloxane polymer having a viscosity of about 24 centipoises at 25°C. and consisting of about 6.50 percent by weight of trimethylsiloxy units, about 79.80 percent by weight of dimethylsiloxy units, and about 13.70 percent by weight of methylvinylsiloxy units, and about 0.3 parts by weight of benzophenone as the photosensitizer with high intensity predominantly continuum light radiation to crosslink the siloxane fluid.

EXAMPLE 5

Similar silicone paper release articles can be prepared by following the procedure of Example 1 and irradiating a silicone release composition free from any solvent and consisting essentially of about 100 parts by weight of a fluid polysiloxane polymer having a viscosity of about 58 centipoises at 25°C. and consisting of about 4.60 percent by weight of trimethylsiloxy units, about 87.60 percent by weight of dimethyl-siloxy units, and about 7.80 percent by weight of methylvinyl-siloxy units, and about 0.3 parts by weight of benzophenone as the photosensitizer with high intensity predominantly continuum light radiation to crosslink the siloxane fluid.

EXAMPLE 6

Similar silicone paper release articles can be prepared by following the procedure of Example 1 and irradiating a silicone release composition free from any solvent and consisting essentially of about 100 parts by weight of a fluid polysiloxane polymer having a viscosity of about 144 centipoises at 25°C. and consisting of about 3.20 percent by weight of trimethylsiloxy units, about 92.60 percent by weight of dimethylsiloxy units, and about 4.20 percent by weight of methylvinylsiloxy units, and about 0.2 parts by weight of benzophenone as the photosensitizer with high intensity predominantly continuum light radiation to crosslink the siloxane fluid.

EXAMPLE 7

Similar silicone paper release articles can be prepared by following the procedure of Example 1 and irradiating a silicone release composition free from any solvent and consisting essentially of about 100 parts by weight of a fluid polysiloxane polymer having a viscosity of about 131 centipoises at 25°C. and consisting of about 3.20 percent by weight of trimethylsiloxy units, about 47.60 percent by weight of dimethylsiloxy units, about 4.20 percent by weight of methyl-vinylsiloxy units, and about 45.00 percent by weight of methylethyl siloxy units, and about 0.3 parts by weight of benzophenone as the photosensitizer with high intensity predominantly continuum light radiation to crosslink the siloxane fluid.

EXAMPLE 8

Similar silicone paper release articles can be prepared by following the procedure of Example 1 and irradiating a silicone release composition free from any solvent and consisting essentially of about 100 parts by weight of a fluid polysiloxane polymer having a viscosity of about 620 centipoises at 25°C. and consisting of about 0.95 percent by weight of trimethylsiloxy units, about 97.63 percent by weight of dimethylsiloxy units, and about 1.42 percent by weight of methyl-vinylsiloxy units, and about 0.2 parts by weight of benzophenone as the photosensitizer with high intensity predominantly continuum light radiation to crosslink the siloxane fluid.

EXAMPLE 9

Similar silicone paper release articles can be prepared by following the procedure of Example 1 and irradiating a silicone release composition free from any solvent and consisting essentially of about 100 parts by weight of a fluid polysiloxane polymer having a viscosity of about 620 centipoises at 25°C. and consisting of about 0.95 percent by weight of trimethylsiloxy units, about 97.63 percent by weight of dimethyl-siloxy units, and about 1.42 percent by weight of methylvinyl-siloxy units, and about 0.3 parts by weight of benzophenone as the photosensitizer with high intensity predominantly continuum light radiation to crosslink the siloxane fluid.

EXAMPLE 10

Similar silicone paper release articles can be prepared by following the procedure of Example 1 and irradiating a silicone release composition free from any solvent and consisting essentially of about 100 parts by weight of a fluid polysiloxane polymer having a viscosity of about 1,740 centipoises at 25°C. and consisting of about 0.60 percent by weight of trimethylsiloxy units, about 98.30 percent by weight of dimethylsiloxy units, and about 1.10 percent by weight of methylvinylsiloxy units, and about 0.1 parts by weight of benzophenone as the photosensitizer with high intensity predominantly continuum light radiation to crosslink the siloxane fluid.

EXAMPLE 11

Similar silicone paper release articles can be prepared by following the procedure of Example 1 and irradiating a silicone release composition free from any solvent and consisting essentially of about 100 parts by weight of a fluid polysiloxane polymer having a viscosity of about 1,740 centipoises at 25°C. and consisting of about 0.60 percent by weight of trimethylsiloxy units, about 98.30 percent by weight of dimethylsiloxy units, and about 1.10 percent by weight of methylvinylsiloxy units, and about 0.2 parts by weight of benzophenone as the photosensitizer with high intensity predominantly continuum light radiation to crosslink the siloxane fluid.

EXAMPLE 12

Similar silicone paper release articles can be prepared by following the procedure of Example 1 and irradiating a silicone release composition free from any solvent and consisting essentially of about 100 parts by weight of a fluid polysiloxane polymer having a viscosity of about 1,740 centipoises at 25°C. and consisting of about 0.60 percent by weight of trimethylsiloxy units, about 98.30 percent by weight of dimethyl-siloxy units, and about 1.10 percent by weight of methylvinyl-siloxy units, and about 0.3 parts by weight of benzophenone as the photosensitizer with high intensity predominantly continuum light radiation to crosslink the siloxane fluid.

EXAMPLE 13

Similar silicone paper release articles can be prepared by following the procedure of Example 1 and irradiating a silicone release composition free from any solvent and consisting essentially of about 100 parts by weight of a fluid polysiloxane polymer having a viscosity of about 2,060 centipoises at 25°C. and consisting of about 0.60 percent by weight of trimethylsiloxy units, about 87.80 percent by weight of dimethyl-siloxy units, about 1.10 percent by weight of methylvinylsiloxy units, and about 10.5 percent by weight of diphenylsiloxy units, and about 0.3 parts by weight of benzophenone as the photosensitizer with high intensity predominantly continuum light radiation to crosslink the siloxane fluid.

EXAMPLE 14

Similar silicone paper release articles can be prepared by following the procedure of Example 1 and irradiating a silicone release composition free from any solvent and consisting essentially of about 100 parts by weight of a fluid polysiloxane polymer having a viscosity of about 2,680 centipoises at 25°C. and consisting of about 0.48 percent by weight of trimethylsiloxy units, about 97.99 percent by weight of dimethylsiloxy units, and about 1.53 percent by weight of methylvinylsiloxy units, and about 0.3 parts by weight of benzophenone as the photosensitizer with high intensity predominantly continuum light radiation to crosslink the siloxane fluid.

EXAMPLE 15

Similar silicone paper release articles can be prepared by following the procedure of Example 1 and irradiating a silicone release composition free from any solvent and consisting essentially of about 100 parts by weight having a viscosity of about 2,680 centipoises at 25°C. and of a fluid polysiloxane polymer consisting of about 0.48 percent by weight of trimethylsiloxy units, about 97.99 percent by weight of dimethylsiloxy units, and about 1.53 percent by weight of methylvinylsiloxy units, and about 0.3 parts by weight of xanthone as the photosensitizer with high intensity predominantly continuum light radiation to crosslink the siloxane fluid.

EXAMPLE 16

Similar silicone paper release articles can be prepared by following the procedure of Example 1 and irradiating a silicone release composition free from any solvent and consisting essentially of about 100 parts by weight of a fluid polysiloxane polymer having a viscosity of about 2,680 centipoises at 25°C. and consisting of about 0.48 percent by weight of trimethylsiloxy units, about 97.99 percent by weight of dimethylsiloxy units, and about 1.53 percent by weight of methylvinylsiloxy units, and about 0.3 parts by weight of acetophenone as the photosensitizer with high intensity predominantly continuum light radiation to crosslink the siloxane fluid.

EXAMPLE 17

Similar silicone paper release articles can be prepared by following the procedure of Example 1 and irradiating a silicone release composition free from any solvent and consisting essentially of about 100 parts by weight of a fluid polysiloxane polymer having a viscosity of about 2,680 centipoises at 25°C. and consisting of about 0.48 percent by weight of trimethylsiloxy units, about 97.99 percent by weight of dimethylsiloxy units, and about 1.53 percent by weight of methylvinylsiloxy units, and about 0.3 parts by weight of 4,4'-bisdimethylaminobenzophenone as the photosensitizer with high intensity predominantly continuum light radiation to crosslink the siloxane fluid.

EXAMPLE 18

Similar silicone paper release articles can be prepared by following the procedure of Example 1 and irradiating a silicone release composition free from any solvent and consisting essentially of about 100 parts by weight of a fluid polysiloxane polymer having a viscosity of about 9,200 centipoises at 25°C. and consisting of about 0.31 percent by weight of trimethylsiloxy units, about 98.74 percent by weight of dimethyl-siloxy units, and about 0.95 percent by weight of methylvinyl-siloxy units, and about 0.3 parts by weight of benzophenone as the photosensitizer with high intensity predominantly continuum light radiation to crosslink the siloxane fluid.

EXAMPLE 19

Similar silicone paper release articles can be prepared by following the procedure of Example 1 and irradiating a silicone release composition free from any solvent and consisting essentially of about 100 parts by weight of a fluid polysiloxane polymer having a viscosity of about 62,000 centipoises at 25°C. and consisting of about 0.17 percent by weight of trimethylsiloxy units, about 98.71 percent by weight of dimethyl-siloxy units, and about 1.12 percent by weight of methylvinyl-siloxy units, and about 0.3 parts by weight of benzophenone as the photosensitizer with high intensity predominantly continuum light radiation to crosslink the siloxane fluid.

EXAMPLE 20

Similar silicone paper release articles can be prepared by following the procedure of Example 1 and irradiating a silicone release composition free from any solvent and consisting essentially of about 100 parts by weight of a fluid polysiloxane polymer having a viscosity of about 142,000 centipoises at 25°C. and consisting of about 0.13 percent by weight of trimethylsiloxy units, about 99.29 percent by weight of dimethylsiloxy units, and about 0.58 percent by weight of methylvinyl-siloxy units, and about 0.3 parts by weight of benzophenone as the photosensitizer with high intensity predominantly continuum light radiation to crosslink the siloxane fluid.

Various modifications and variations of this invention will be obvious to a worker skilled in the art and it is to be understood that such modifications and variations are to be included within the purview of this application and the spirit and scope of the appended claims.

What is claimed is:

1. A curable silicone release composition consisting essentially of (A) a crosslinkable organopolysiloxane having the average formula $$\left[ R_n SiO_{\frac{4-n}{2}} \right]_x$$

wherein $n$ has an average value of from about 1.8 to about 2.2, wherein $x$ has an average value greater than 2, wherein each R is individually selected from the group consisting of unsubstituted and substituted monovalent hydrocarbon radicals having from one to 20 carbon atoms and having an average of at least two pendent silicon bonded olefinic siloxy units of the formula:

wherein R is the same as defined above and wherein X is an olefinic radical directly bonded to the silicon atom through a silicon to carbon (Si-C) bond, and (B) a photosensitizing amount of a photosensitizer.

2. A composition as defined in claim 1 wherein R is a member selected from the group consisting of alkyl and phenyl radicals and wherein the olefinic radical is selected from the group consisting of vinyl, allyl, cyclohexenyl and methacryloxypropyl radicals.

3. A composition as defined in claim 1 wherein the organopolysiloxane consists essentially of dimethyl siloxy units and at least two methylvinyl siloxy units per polymer molecule and terminal trimethyl siloxy units.

4. A composition as defined in claim 1, wherein an inert organic solvent is present as an additional ingredient.

5. A composition as defined in claim 1, wherein the photosensitizer is benzophenone.

6. A composition as defined in claim 1, wherein the olefinic radical is a vinyl radical.

7. A paper substrate coated with a curable silicone release composition as defined in claim 1.

8. A paper substrate coated with a curable silicone release composition as defined in claim 2.

9. A paper substrate coated with a curable silicone release composition as defined in claim 3.

10. A paper substrate coated with a curable silicone release composition as defined in claim 4.

11. A paper substrate coated with a curable silicone release composition as defined in claim 5.

12. A paper substrate coated with a curable silicone release composition as defined in claim 6.

13. A process for preparing silicone paper release articles comprising applying the release composition as defined in claim 1, to a paper substrate and exposing the composition to high intensity predominantly continuum light radiation having a source intensity of at least about 350 watts per square centimeter steradian when integrated throughout the entire spectral range of said continuum light radiation with a positive amount of up to 30 percent of the total light radiated at wavelengths shorter than 4,000 Angstrom units and at least 70 percent of the light radiated at wavelengths longer than 4,000 Angstrom units to crosslink the siloxane compound.

14. A process as defined in claim 13, wherein the source of said high intensity predominantly continuum light radiation is a swirl-flow plasma arc means.

15. A process for preparing silicone paper release articles comprising applying the release composition as defined in claim 2, to a paper substrate and exposing the composition to high intensity predominantly continuum light radiation having a source intensity of at least about 350 watts per square centimeter steradian when integrated throughout the entire spectral range of said continuum light radiation with a positive amount of up to 30 percent of the light radiated at wavelengths shorter than 4,000 Angstrom units and at least 70 percent of the light radiated at wavelengths longer than 4,000 Angstrom units to crosslink the siloxane compound.

16. A process as defined in claim 15, wherein the source of said high intensity predominately continuum light radiation is a swirl-flow plasma arc means.

17. A process for preparing silicone paper release articles comprising applying the release composition as defined in claim 3, to a paper substrate and exposing the composition to high intensity predominantly continuum light radiation having a source intensity of at least about 350 watts per square centimeter steradian when integrated throughout the entire spectral range of said continuum light radiation with a positive amount of up to 30 percent of the light radiated at wavelengths shorter than 4,000 Angstrom units and at least 70 percent of the light radiated at wavelengths longer than 4,000 Angstrom units to crosslink the siloxane compound.

18. A process as defined in claim 17, wherein the source of said high intensity predominantly continuum light radiation is a swirl-flow plasma arc means.

19. A process for preparing silicone paper release articles comprising applying the release composition as defined in claim 4, to a paper substrate and exposing the composition to high intensity predominantly continuum light radiation having a source intensity of at least about 350 watts per square centimeter steradian when integrated throughout the entire spectral range of said continuum light radiation with a positive amount of up to 30 percent of the light radiated at wavelengths shorter than 4,000 Angstrom units and at least 70 percent of the light radiated at wavelengths longer than 4,000 Angstrom units to crosslink the siloxane compound.

20. A process as defined in claim 19, wherein the source of said high intensity predominantly continuum light radiation is a swirl-flow plasma arc means.

21. A process for preparing silicone paper release articles comprising applying the release composition as defined in claim 5, to a paper substrate and exposing the composition to high intensity predominantly continuum light radiation having a source intensity of at least about 350 watts per square centimeter steradian when integrated throughout the entire spectral range of said continuum light radiation with a positive amount of up to 30 percent of the light radiated at wavelengths shorter than 4,000 Angstrom units and at least 70 percent of the light-radiated at wavelengths longer than 4,000 Angstrom units to crosslink the siloxane compound.

22. A process as defined in claim 21 wherein the source of said high intensity predominantly continuum light radiation is a swirl-flow plasma arc means.

23. A process for preparing silicone paper release articles comprising applying the release composition as defined in claim 6, to a paper substrate and exposing the composition to high intensity predominantly continuum light radiation having a source intensity of at least about 350 watts per square centimeter steradian when integrated throughout the entire spectral range of said continuum light radiation with a positive amount of up to 30 percent of the light radiated at wavelengths shorter than 4,000 Angstrom units and at least 70 percent of the light radiated at wavelengths longer than 4,000 Angstrom units to crosslink the siloxane compound.

24. A process as defined in claim 23, wherein the source of said high intensity predominantly continuum light radiation is a swirl-flow plasma arc means.

25. A silicone paper release article prepared according to the process as defined in claim 14.

26. A silicone paper release article prepared according to the process as defined in claim 15.

27. A silicone paper release article prepared according to the process as defined in claim 17.

28. A silicone paper release article prepared according to the process as defined in claim 19.

29. A silicone paper release article prepared according to the process as defined in claim 21.

30. A silicone paper release article prepared according to the process as defined in claim 23.

* * * * *